Nov. 7, 1961 F. J. SOMES, JR 3,007,996
CONNECTOR FOR ELECTRICAL DISTRIBUTION SYSTEMS
Original Filed March 5, 1957 5 Sheets-Sheet 4
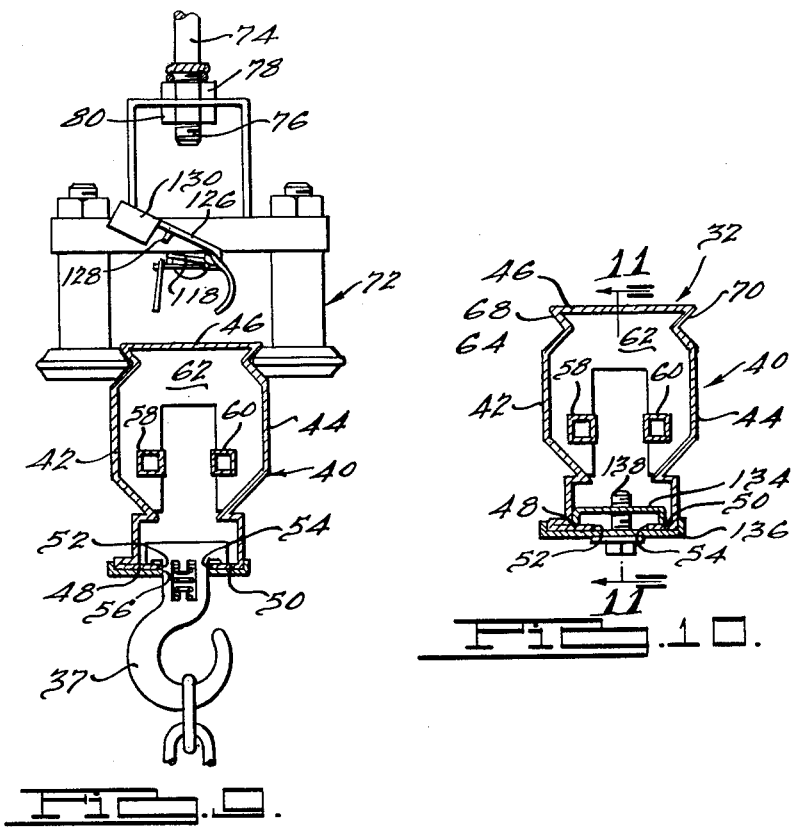
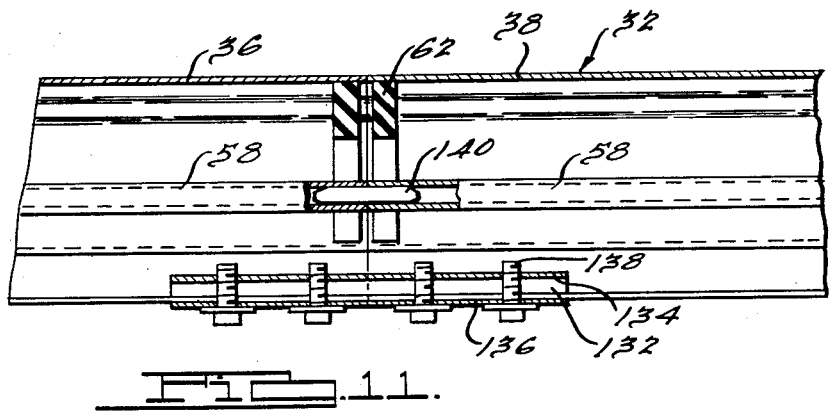
INVENTOR.
Frederick J. Somes,
BY
Harness, Dickey & Pierce
ATTORNEYS.

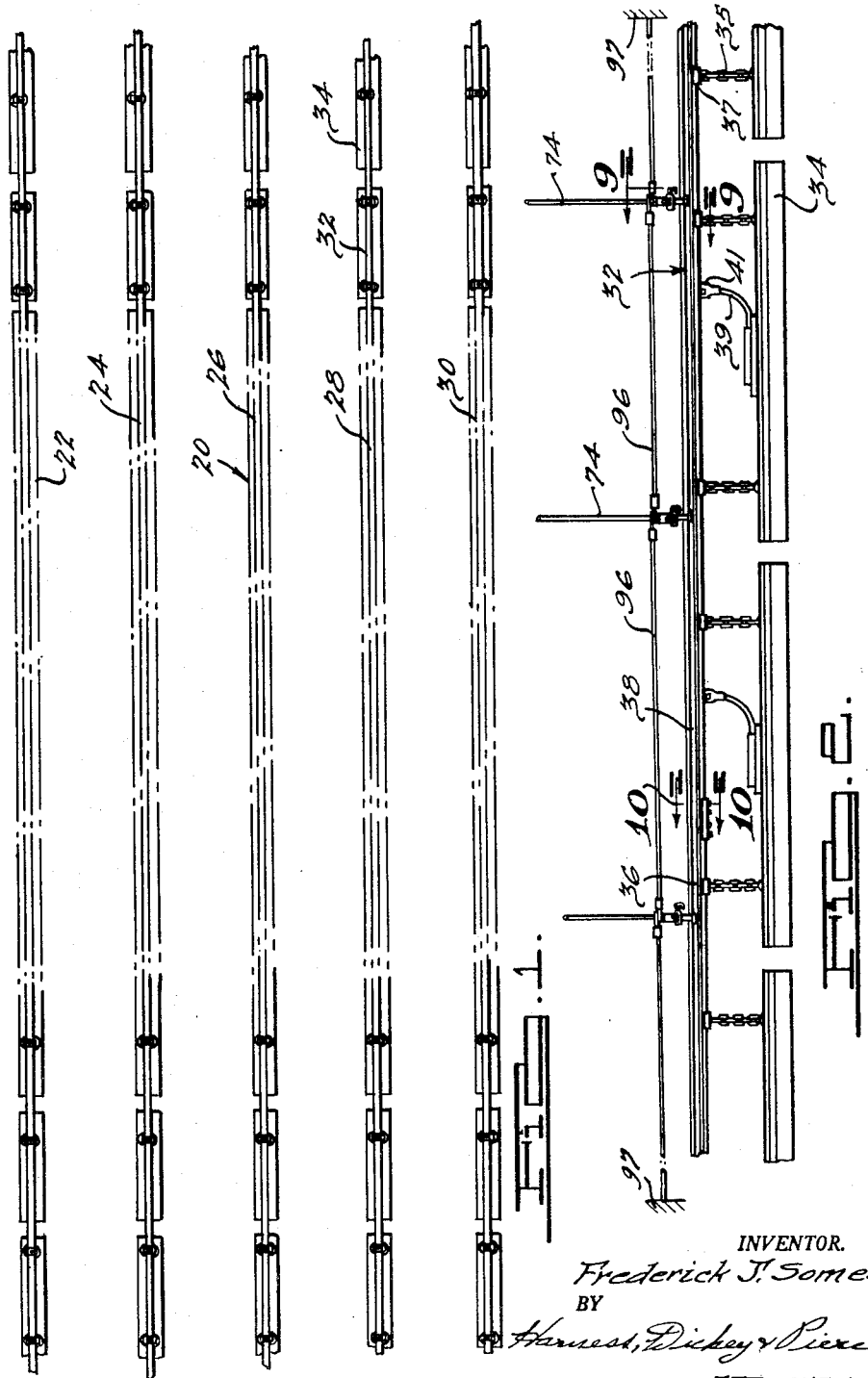

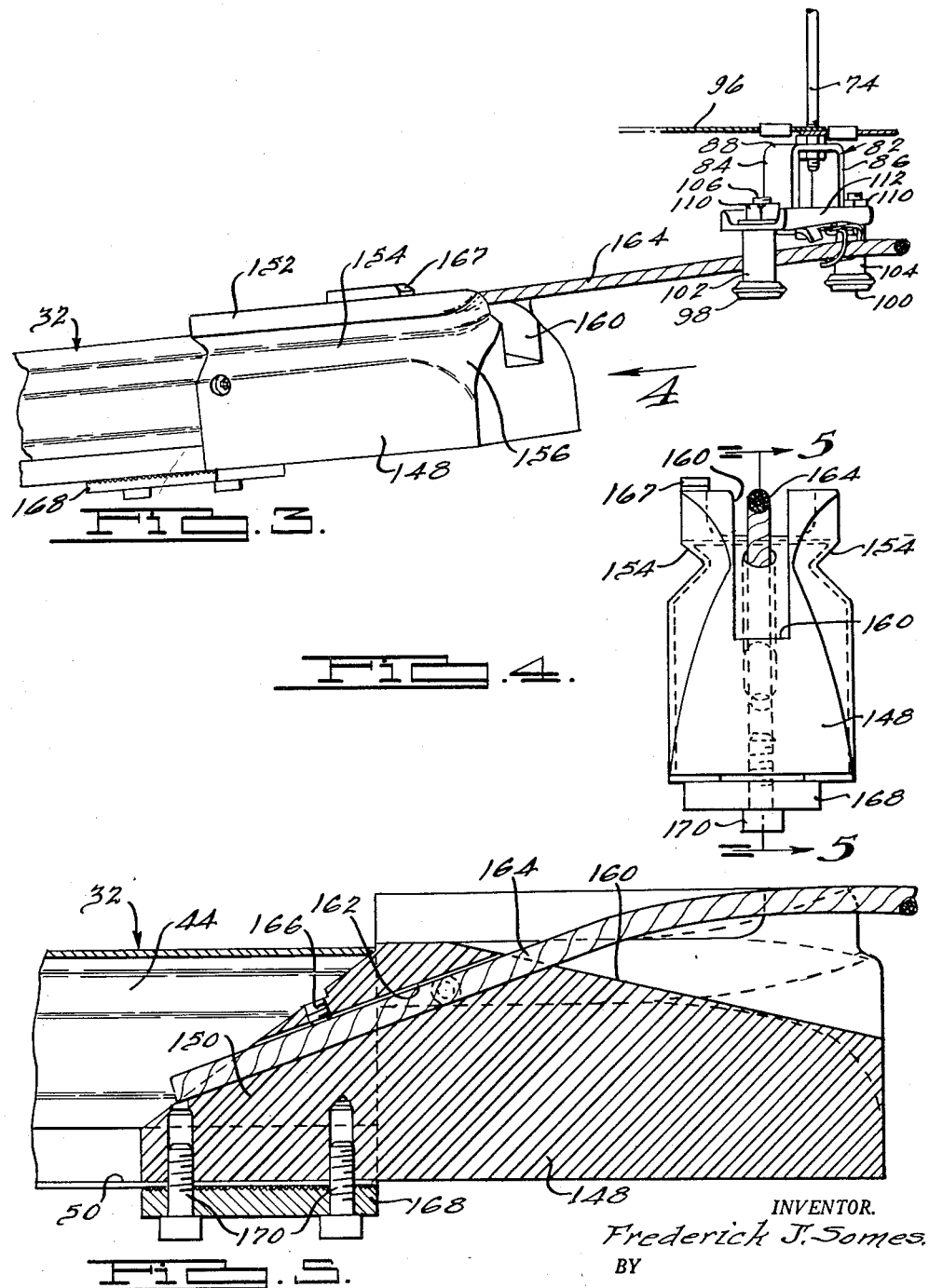

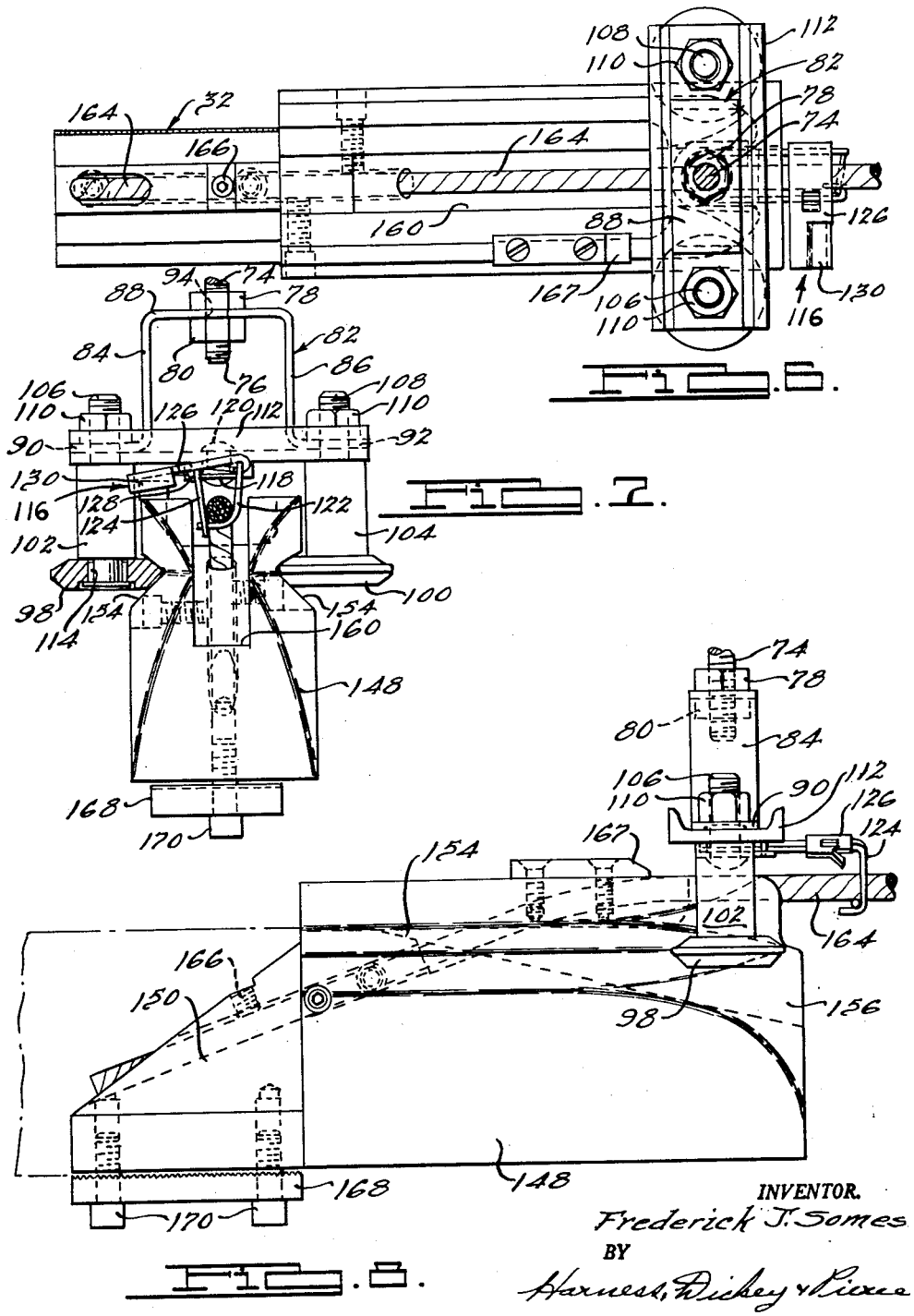

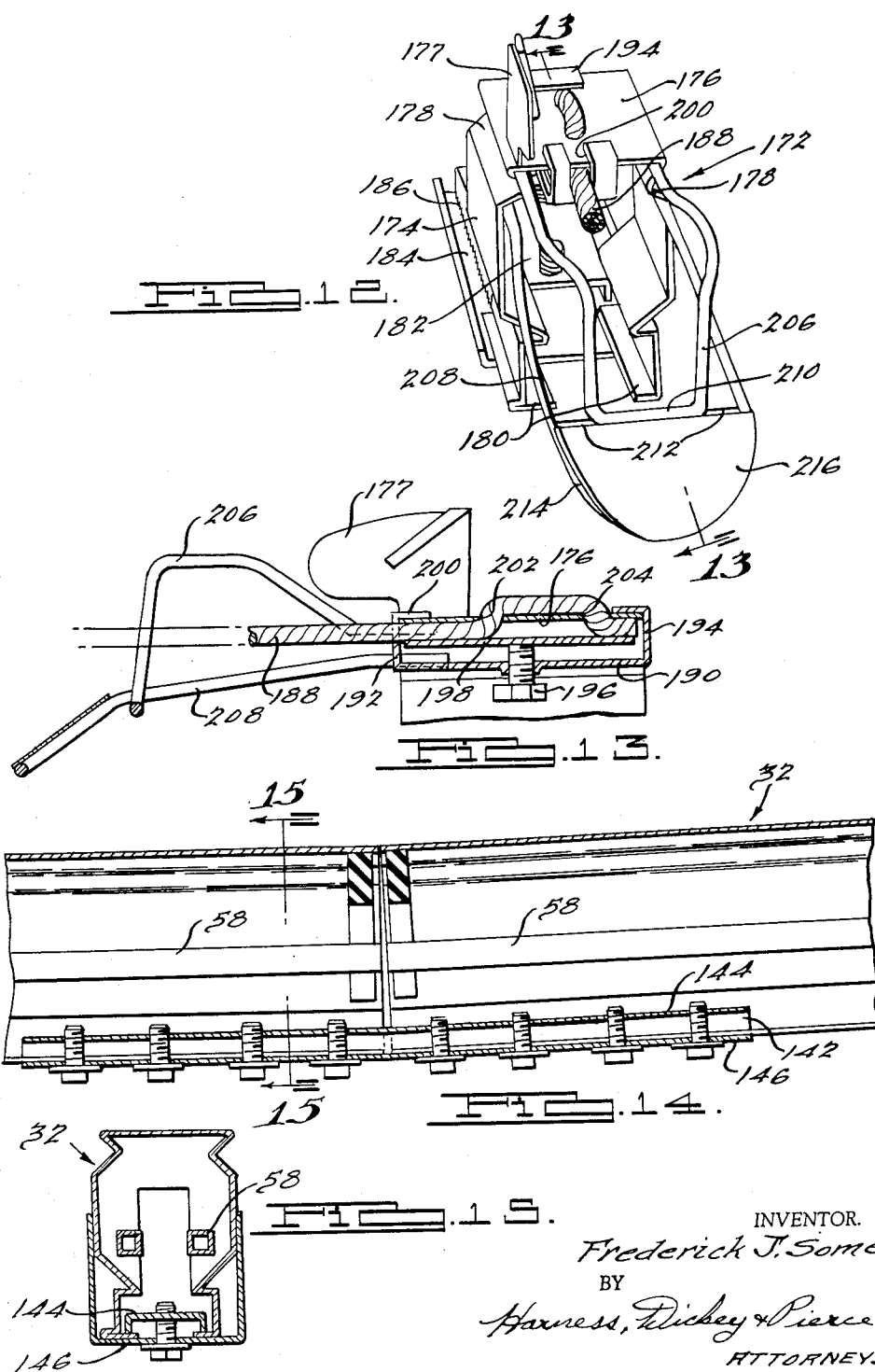

United States Patent Office 3,007,996
Patented Nov. 7, 1961

3,007,996
CONNECTOR FOR ELECTRICAL DISTRIBUTION SYSTEMS
Frederick J. Somes, Jr., Detroit, Mich., assignor to General Electric Company, a corporation of New York
Original application Mar. 5, 1957, Ser. No. 643,977, now Patent No. 2,931,097, dated Apr. 5, 1960. Divided and this application Oct. 2, 1957, Ser. No. 687,755
2 Claims. (Cl. 174—40)

This invention relates to electrical power distribution systems and apparatus for installing the same. More particularly, the invention relates to improved apparatus for supporting an electrical power distribution system during and after the installation thereof, and improved methods and apparatus for installing electrical power distribution systems which are particularly adapted for large scale installations such as industrial plants. This application is a division of the applicant's co-pending application Serial No. 643,977, filed March 5, 1957 now Patent Number 2,931,097.

An object of the invention is to provide improved apparatus for supporting the components of an electrical power distribution system during and after the installation thereof.

Another object of the invention is to provide an improved electrical power distribution system incorporating novel means which reduces to a minimum the time, labor and expense required to install and maintain the system.

It is a further object to provide an improved power distribution system of this character, and method for installing the same, which will minimize or eliminate undesired deflection of the parts both during and after installation, thus facilitating the assembly operation and resulting in a sturdy installation capable of withstanding heavy use.

It is also an object to provide, in one form of the invention, an improved installation mechanism for electrical distribution systems which is of extremely inexpensive construction and may be fabricated using standard materials and with a minimum of machining expenses.

It is another object to provide an improved installation mechanism for electrical distribution systems which includes novel means for releasably guiding one portion of the installation mechanism and which reduces to a minimum the effort required to move the system parts into installed position.

The above as well as other objects and advantages of the present invention will become apparent from the following description, the appended claims, and the accompanying drawings, wherein:

FIGURE 1 is a top plan view of electrical power distribution apparatus embodying the present invention, showing the same installed in an electrical power distribution system;

FIGURE 2 is an enlarged side elevational view of a portion of the structure illustrated in FIGURE 1;

FIGURE 3 is a perspective view of apparatus embodying the present invention, showing the same during an installation with the guide block about to enter the supporting rollers;

FIGURE 4 is an end view of the guide block and attached cable;

FIGURE 5 is a longitudinal sectional view of the structure illustrated in FIGURE 4, taken on the line 5—5 thereof and showing the manner of attaching the cable to the guide block;

FIGURE 6 is a top plan view of apparatus embodying the present invention, showing the guide block entering between the rollers FIGURE 7 is an end elevational view of the structure illustrated in FIGURE 6 with portions sectioned for clarity, showing the position of the releasable guide and the anti-friction bearing for a roller;

FIGURE 8 is a side elevational view of the structure illustrated in FIGURE 6;

FIGURE 9 is a transverse sectional view of a portion of the structure illustrated in FIGURE 2, taken on the line 9—9 thereof, showing the cable guide in released position;

FIGURE 10 is a transverse sectional view of a portion of the structure illustrated in FIGURE 2, taken on the line 10—10 thereof and showing the construction of the trolley duct;

FIGURE 11 is a sectional elevational view of the structure illustrated in FIGURE 10, taken on the line 11—11 thereof and showing the duct connector;

FIGURE 12 is a perspective view of another embodiment of the guide block;

FIGURE 13 is a longitudinal sectional view of the structure illustrated in FIGURE 12, taken on the line 13—13 thereof;

FIGURE 14 is a longitudinal sectional view of the duct connector used between the first two duct sections; and FIGURE 15 is a transverse sectional view of a portion of the structure illustrated in FIGURE 14, taken on the line 15—15 thereof.

In general, the improved method of installing the electrical power distribution apparatus includes the steps of electrically and mechanically joining two initially separate sections of a trolley duct in end-to-end relationship to form an elongated unitary structure, the sections being joined at a particular location, such as at one end of a proposed busway; moving the joined sections a predetermined distance along a predetermined path; suspending the joined sections at predetermined spaced intervals; restraining the suspending means against movement in a direction substantially parallel to the direction of the proposed busway; and thereafter successively electrically and mechanically joining additional sections in end-to-end relationship with respect to the previously joined sections, moving the joined sections a predetermined additional distance after each new section is added, and suspending the joined sections at additional spaced intervals until all of the desired sections have been electrically and mechanically connected and moved to the desired location.

The apparatus of the present invention incorporates improved means which facilitate the rapid installation of a relatively large electrical power distribution system with a minimum of equipment, labor and expense. The apparatus also incorporates improved means which materially increases the efficiency of the workmen installing the system, thereby increasing the work output rate of the workmen and reducing the cost of the system.

Referring to the drawings, and more particularly to FIGURE 1 thereof, an electrical power distribution system, generally designated 20, is illustrated which is comprised of a plurality of spaced, substantially parallel rows 22, 24, 26, 28 and 30 of trolley ducts 32 which are adapted to supply electrical power to lighting fixtures 34 or other desired electrical equipment. In the illustrated embodiment of the invention, fixtures 34 are shown in FIGURE 2 as being suspended by chains 35 which are secured to trolley ducts 32 by hooks 37, the fixtures being electrically connected to trolley ducts 32 by conduits 39 and conventional plugs or trolleys 41. While multiple trolley ducts 32 are illustrated, it will be understood that the present invention may be utilized in the installation of only one trolley duct, if desired. Each of the rows of trolley ducts may, for example, extend for several hundred feet, the electrical power distribution system 20 illustrated being particularly adapted for factories or other relatively large buildings.

In the embodiment of the invention illustrated, each of the trolley ducts 32 includes a plurality of sections, such as 36 and 38 shown in FIGURE 11, which are electrically and mechanically joined together in end-to-end relationship to form a unitary structure. The individual sections may be of any desired or conventional length; for example, each section may be approximately ten feet in length.

As shown in FIGURES 9 and 10, each section of trolley duct 32 includes a housing generally indicated at 40 having spaced side walls 42 and 44 joined by a top wall 46. The lower end portions of the side walls, as viewed in FIGURES 9 and 10, are provided with inwardly extending flanges 48 and 50, the inner edges 52 and 54 of which terminate in spaced substantially parallel relationship to define an elongated slot 56. Flanges 48 and 50 serve as tracks which extend along housing 40 and upon which conventional trolleys, plugs or other connectors such as conduits 39 of FIGURE 2 are mounted in a conventional manner.

Housing 40 encloses electrical conductors 58 and 60 disposed in spaced relationship with respect to walls 42, 44 and 46 of the housing. The conductors are also disposed in inwardly spaced relationship with respect to the flanges 48 and 50, electrical insulators 62 being provided at spaced intervals to support conductors 58 and 60 and electrically insulate the conductors from the housing. At a position adjacent top wall 46, the side walls are provided with generally V-sectioned longitudinally extending inclined sections which form grooves 68 and 70 extending longitudinally of the housing 40 for the entire length thereof. These grooves are adapted to engage the supporting assemblies as will be described below in greater detail.

In order to support the ducts, a plurality of spaced supporting assemblies generally indicated at 72 in FIGURE 9 and having vertically extending suspension rods 74 are provided, the upper end portions of these rods being fixed to the roof trusses or other appropriate supporting structures of the building. Any desired or conventional means, such as clamps, may be employed to fix the upper end portions of the rods to the roof trusses. The lower end portions of the rods are threaded, as at 76 in FIGURE 7, for the reception of nuts 78 and 80. A plurality of brackets 82 are provided, each having a pair of depending legs or side portions 84 and 86 integrally joined by a web portion 88, the free ends of the side portions 84 and 86 being provided with outwardly projecting flanges 90 and 92. The lower end portion of each rod 74 projects through an aperture 94 in the web portion of the associated bracket and the web portion is retained on the stringer by nuts 78 and 80. Although fixed with respect to rod 74, the nuts are not tightened against the web portion with the result that the bracket is permitted to rotate about the longitudinal axis of the associated rod. This will permit the bracket and its associated parts to adjust themselves to the entering duct, as described later.

In order to maintain the positions of suspension rods 74 when the duct housing is being installed, a plurality of tension wires 96 extend between adjacent rods, as seen best in FIGURE 2. These wires are secured to the rods at the lower ends thereof, and the first and last wires in a row will be secured to adjacent portions 97 of the stationary structure. Any tendency of rods 74 to sway in the direction of movement of the duct bars as they are being installed will be resisted by the combined effect of wires 96, thus facilitating the installation process.

For the purpose of supporting the duct housing, a pair of spaced rollers 98 and 100 are suspended from each bracket 82. In particular, rollers 98 and 100 are rotatably mounted on vertical stub shafts 102 and 104 respectively as seen in FIGURE 7, these shafts having reduced and threaded upper ends 106 and 108 projecting through bracket flanges 90 and 92 and secured to these flanges by nuts 110. A channel-shaped cross member 112 is secured between the shouldered portions of shafts 102 and 104 and flanges 90 and 92. Anti-friction bearings 114 are provided at the lower ends of shafts 102 and 104 for rotatably supporting rollers 98 and 100. The supporting elements are each provided with beveled surfaces adapted to project into the longitudinally extending grooves 68 and 70 provided on the duct housing, thus providing a firm support which prevents transverse rocking of the housing but permits it to glide longitudinally.

A releasable guide 116 is provided between each pair of rollers which serves to guide a cable, as will be described hereinafter in greater detail. The guide includes a spring 118, best seen in FIGURES 7, 8 and 9, the coiled central portion of which is secured to the underside of crosspiece 112 by a rivet and washer 120. The end portions of the spring project forwardly of the crosspiece and one end portion 122 is bent downwardly and transversely while the other end portion 124 is bent downwardly and rearwardly so that the transversely projecting section of portion 122 rests on the rearwardly projecting section of portion 124 when the guide member is in the closed position. In order to releasably retain spring 118 in the above-described closed position, a clamp 126 is provided, one end of which is pivoted to portion 122 of the spring. A flange 128 is provided on the outer end of the clamp, the flange projecting downwardly and bearing against portion 124 of the spring so as to restrain this portion against lateral movement. Clamp 126 is also provided with a downwardly projecting tab 130 which is adapted to be engaged by a cam so as to release the spring, thereby permitting the cable to drop from guide 116, as will be described below in greater detail. It will be noted that each bracket 82, together with its associated parts including rollers 98 and 100, and guide 116, constitutes a supporting assembly, designated generally at 72, for the duct housing.

For the purpose of mechanically joining individual sections of trolley duct 32 in end-to-end relationship, a plurality of connectors 132 are provided which overlap adjacent sections of the trolley duct, as seen in FIGURES 10 and 11. Each of the connectors includes an inner element 134 and an outer elmeent 136, both of these elements being of channel-shaped cross section. The distance between the outer surfaces of the flanges of inner element 134 is less than the distance between the inner surfaces of the flanges of outer element 136 and, as shown in FIGURES 10 and 11, the flanges are adapted to engage the lower ends of the side walls 42 and 44 of the housing 40 at a position adjacent the junction of these side walls with the flanges 48 and 50 respectively. A plurality of screws 138 are provided which extend through the web portions of elements 136 and threadably engage the web portions of elements 134. With such a construction, when the screws are tightened, flanges 48 and 50 of the housing are clamped between the flanges of inner element 134 and the web of outer element 136. The length of connectors 132 is sufficient to provide a firm frictional grip on housings 40 which will hold adjacent housings in end-to-end relation.

In the assembly of the sections of the trolley duct, one end portion of a connector 132 is secured to one end portion of a housing 40 in the manner previously described, after which the adjacent housing section is slidably inserted in the other end portion of the connecting member so that the flanges 48 and 50 of the second housing are disposed between the inner and the outer elements of the connector in the manner previously described. The screws are then tightened so as to securely clamp the adjacent sections of the trolley duct in end-to-end relationship.

Any desired means may be provided for electrically connecting conductors 58 and 60 of the adjacent sections of the trolley duct. For example, conventional pins 140 may be utilized, the pins being inserted in the end portions of conductors 58 and 60 in the conventional manner, as shown in FIGURE 11.

To facilitate the installation of the trolley ducts, a connector 142 is also provided which is adapted to mechanically join the first and second sections of the trolley duct in end-to-end relationship. It will be noted that since the first section of the duct will at times be unsupported, its connection with the second section will be subject to a bending stress. Connector 142 includes an inner element 144 and an outer element 146 similar in construction to the corresponding elements of connectors 132, as seen in FIGURE 14. However, in order to compensate for deflection of the first and second sections of the trolley duct during the installation thereof, the leading end portion of connector 142 is bent upwardly relative to the trailing end thereof. With such a construction, the tendency of the leading section to sag when unsupported by rollers 98 and 100 will be counteracted by the original upward inclination given it by connector 142, as seen in FIGURE 14, and the entire assembly will therefore retain a substantially aligned condition. Connector 142 will be mounted in a manner similar to that described with respect to connector 132.

A guide block 148 is provided which is adapted to be secured to the free end of the leading section of the trolley duct to facilitate the installation thereof. The guide block includes a body portion having an extension 150 projecting outwardly and rearwardly from the lower edge thereof, as seen in FIGURE 5, and a head portion 152 which is joined to and narrower than the body. Between the head portion and the body portion, a pair of guideways 154 are provided. Each of the guideways includes a converging section 156 at the forward end and a substantially straight section, the straight sections being of substantially the same configuration as grooves 68 and 70 in housing 40. An upwardly open slot 160 is also provided in the head portion of the guide block, the slot sloping upwardly and rearwardly and communicating with a diagonally downwardly extending aperture 162 defined by the body portion, as seen in FIGURE 5. Aperture 162 is adapted to receive a cable 164 and a plurality of set screws 166 are provided to releasably secure the cable to the guide block, so that the guide block and the attached trolley duct may be pulled through the agency of the cable and the cable disassembled from the guide block when a trolley duct has been completed. A cam 167 having an upwardly and rearwardly sloping surface is fixed to the top of guide block 148 for engagement with tab 130 of guide clamp 126, so that guide 116 may be automatically released as described below.

In securing guide block 148 to the free end of the leading section of a trolley duct 32, extension 150 of the guide block is inserted intermediate the side walls 42 and 44 of the housing, as seen in FIGURES 5 and 6, so that the bottom wall of the extension engages the inner surfaces of the flange portions 48 and 50 of the housing. Flanges 48 and 50 are clamped between extension 150 of the guide block and a retaining plate 168 having a serrated surface which engages the outer surfaces of the flange portions 48 and 50 of the housing. Screws 170 are provided which extend through retaining element 168 and threadably engage extension 150 of the guide block to clamp the guide block to the trolley duct. When the guide block is mounted on the trolley duct, guideways 154 on the guide block are aligned with grooves 68 and 70 of the trolley duct, the upper surfaces of the guideways being substantially coplanar with grooves 68 and 70 in constituting a continuation thereof.

In the installation of the electrical power system, supporting assemblies 72 are suspended from a roof truss or other suitable stationary supporting structure at spaced intervals and in aligned relationship along the proposed rows of trolley ducts, the supporting assemblies being suspended from the roof truss, for example, by suspension rods 74 in such manner that they are free to rotate about the rod axes. Guides 116 are placed in their closed position so that the end portions of spring 118 are disposed in the previously described relation and retained by clamp 126. Cable 164 is then passed through guides 116 in one row as shown in FIGURES 6, 7 and 8 as well as in FIGURE 3, after which the free end of the cable is inserted in aperture 162 of guide block 148 and secured to the guide block by set screws 166. The cable extends along the proposed location of the trolley duct and a winch (not shown) or other suitable means is provided at the free end of the cable.

Guide block 148 is secured to the leading end of the first section of the trolley duct in the manner previously described, after which the trailing end of the first section is mechanically and electrically connected to the second section in end-to-end relationship through the agency of connector 142 and pins 140. Succeeding sections of the duct are joined through pins 140 and connectors 132. The individual sections of trolley duct are preferably joined at one location, such as at one end of each proposed row of duct, thereby obviating the necessity of the workman moving from such location during the assembly of the duct.

After the first and second sections have been secured together in end-to-end relationship, such sections are pulled toward the nearest supporting assembly 72 by cable 164. As the guide block approaches the first supporting assembly, guide 116 on the first support member tends to raise the guide block toward rollers 98 and 100 and, at the same time, connector 142 tends to compensate for the deflection of the unsupported first section of the trolley duct. It will be appreciated that with an elongated section of trolley duct, the end being pulled by the cable will tend to sag downwardly away from the supporting assembly, and guide 116 as well as connector 142 will serve to guide the guide block toward the rollers.

Converging portions 156 of grooves 154 initially engage rollers 98 and 100. As the guide block moves through the rollers, grooves 154 on the guide block will align grooves 68 and 70 of the housing with the rollers, and the latter will thus glidably support the initially joined sections of the trolley duct. During this movement, cam 167 will engage tab 130, lifting clamp 126 and permitting the end portions of guide spring 118 to spread apart so that the end of cable 164 which is fastened to guide block 148 may pass through. The position of cam 167 is such that when cable 164 is released rollers 98 and 100 will be supporting guide block 148. The pivotal connection between bracket 82 and suspension rod 74 will permit the rollers to adjust themselves to receive the guide block, and tension wires 96 will prevent any tendency of rods 74 to sway in the direction of movement of the duct housing.

The remaining sections of the trolley duct are then successively electrically and mechanically joined to the previously joined sections, the mechanical connections being effected through the agency of connectors 132, and the joined sections are pulled by the cable through the supporting assemblies. The guide block thus effects the initial engagement with the rollers of each supporting assembly and serves to align the duct grooves with the rollers.

After all the sections of a trolley duct have been joined together and pulled into engagement with the supporting assemblies, the cable and guide block may be removed and reused. Conductors 58 and 60 may, of course, be electrically connected to a suitable source of potential in any desired manner. Light fixtures 34 or other electrical equipment may be installed during the assembly of the trolley duct or may be installed after the trolley duct is in its final position.

FIGURES 12 and 13 illustrate a modified form of the guide block which is similar in principle to that previously described but incorporates novel features which greatly reduce its cost of manufacture. The modified guide block, generally indicated at 172, comprises a shell-like body portion 174 of sheet metal having a pair of side walls connected by an upper web 176. An upwardly extending cam structure 177, corresponding in function to cam 167 of the previous embodiment, is secured to web 176. Outwardly facing longitudinal grooves 178 of V-shaped cross section are formed in body 174 between the side walls and upper web, these grooves being adapted to conform to the periphery of the rollers previously described. The lower portions of the body side walls are bent inwardly, as shown in FIGURE 12, with a pair of inwardly extending flanges 180. A pair of clamping plates 182 and 184 are disposed on opposite sides of flanges 180 at the rearward portion of guide block 172, these brackets being adapted to secure the guide block to a duct housing section in a manner similar to that described with respect to extension 150 and gripping plate 168 of the previous embodiment. In particular, gripping teeth 186 are provided on the downwardly extending flanges of plate 182 so that the flanges of the duct housing as well as flanges 180 of guide block 172 may be simultaneously gripped between plates 182 and 184.

The guide block shown in FIGURES 12 and 13 is also provided with means for securing a cable 188, this means including a bracket 190 having a pair of upwardly and inwardly extending flanges 192 and 194 engaging the front and rear edges of housing web 176. Bracket 190 is disposed beneath the housing web and is provided with a clamping nut 196 threadably mounted therein, this nut being engageable with a gripping plate 198 disposed between bracket 190 and the underside of web 176. A clearance slot 200 is formed in forward flange 192 of bracket 190 for the reception of cable 188, and a pair of apertures 202 and 204 are formed in web 176 so that the cable may be threaded through these apertures. When cable 188 is in the position shown in FIGURE 13, screw 196 may be tightened to clamp the cable firmly between gripping plate 198 and the underside of web 176, the disposition of the cable within apertures 202 and 204 further adding to the gripping effect of the device.

In order to provide guide means to facilitate entry of the rollers into grooves 178, guide block 172 is provided with a pair of wire loops 206 and 208 so formed as to present a pair of converging paths within which the rollers will be guided so as to enter grooves 178. Wire 206 is looped as shown in FIGURE 12 with its rearwardly extending legs secured between the upper portions of grooves 178 and web 176. The forward leg portions of wire 206 extend upwardly, forwardly and then downwardly as shown in FIGURES 12 and 13, with the downwardly directed leg sections being closer together than the remainder of the legs. Wire 208 is likewise of looped form with its rearwardly extending legs secured to housing 174 below grooves 178, and this wire extends forwardly and downwardly as seen in FIGURE 13. Central portion 210 of wire 206 is secured to a pair of crosspieces 212 extending between the legs of wire 208, as best seen in FIGURE 12, for strengthening purposes.

The looped central portion 214 of wire 208 carries a tongue plate 216 to further aid the guiding function of block 172. It will be seen that with this constructional arrangement, which is relatively inexpensive to fabricate, wires 206 and 208, together with tongue plate 216, will form a pair of converging paths which will guide the block between rollers 98 and 100, previously described, until these rollers come into engagement with grooves 178.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In an electrical distribution system of the type in which a plurality of elongated duct sections are drawn successively into engagement with a plurality of spaced aligned supporting assemblies, first and second duct sections for said system, said sections each comprising an upper web, a pair of downwardly extending legs, and a pair of bottom flanges, a connector for fastening together said first and second sections, said connector comprising upper and lower elements engageable with opposite sides of the flanges on said first and second sections, those portions of said elements engageable with said first section being bent upwardly from the remainder of said elements, and means for holding said elements in tight engagement with said flanges, whereby said connector will tend to hold said first duct section in an upwardly tilted position with respect to said second duct section.

2. Electric power distribution apparatus comprising a plurality of elongated duct sections each comprising a generally tubular housing and a plurality of electrical conductors supported in insulated relation therein, means electrically and mechanically connecting said duct sections in end-to-end substantially straight-line relation, a plurality of roller supporting means engaging said duct sections at longitudinally spaced points and suspending said sections in elevated condition, each of said supports comprising at least one roller engaging a portion of said housings, said supporting means supporting said sections for rolling movement in a direction parallel to their length, a leading duct section, initial connecting means connecting said leading duct section in endwise relation to said connected plurality of duct sections, said initial connecting means comprising at least one splicing plate having portions overlapping adjacent end portions of said leading duct section and an adjacent one of said connected duct sections, the portion of said splice plate overlapping said leading duct section being bent upwardly relative to the remaining portion of said splice plate, and means for rigidly attaching said splice plate to each of the duct sections connected thereby to rigidly connect said leading duct section in upwardly tilted relation to said plurality of connected duct sections, whereby to facilitate engagement of the leading end of said leading section with each of said roller supporting means as said sections are moved longitudinaly in the direction of said leading section.

References Cited in the file of this patent

UNITED STATES PATENTS

| | | |
|---|---|---|
| 1,504,954 | Kamp | Aug. 12, 1924 |
| 2,462,721 | Cohen | Feb. 22, 1949 |
| 2,626,301 | Hammerly | Jan. 20, 1953 |
| 2,840,400 | D'Azzo | June 24, 1958 |

FOREIGN PATENTS

| | | |
|---|---|---|
| 725,305 | Great Britain | Mar. 2, 1955 |